(12) United States Patent
 Thelander

(10) Patent No.: US 11,761,159 B2
(45) Date of Patent: Sep. 19, 2023

(54) PASSENGER BRIDGE

(71) Applicant: FMT INTERNATIONAL TRADE AB, Malmo (SE)

(72) Inventor: Per Thelander, Hollviken (SE)

(73) Assignee: FMT International Trade AB, Malmö (SE)

( * ) Notice: Subject to any disclaimer, the term of this patent is extended or adjusted under 35 U.S.C. 154(b) by 3 days.

(21) Appl. No.: 17/904,865

(22) PCT Filed: Feb. 25, 2021

(86) PCT No.: PCT/SE2021/050156
§ 371 (c)(1),
(2) Date: Aug. 23, 2022

(87) PCT Pub. No.: WO2021/173065
PCT Pub. Date: Sep. 2, 2021

(65) Prior Publication Data
US 2023/0113112 A1    Apr. 13, 2023

(30) Foreign Application Priority Data

Feb. 25, 2020   (SE) .................................. 2050212-6

(51) Int. Cl.
*E01D 15/12* (2006.01)
*E01D 15/24* (2006.01)
(Continued)

(52) U.S. Cl.
CPC ............ *E01D 15/124* (2013.01); *B63B 27/14* (2013.01); *B64F 1/305* (2013.01); *E01D 15/24* (2013.01); *B63B 2027/141* (2013.01)

(58) Field of Classification Search
CPC ....... E01D 15/124; E01D 15/24; B63B 27/14; B63B 2027/141
(Continued)

(56) References Cited

U.S. PATENT DOCUMENTS 4,559,660 A    12/1985  Lichti
6,668,411 B1   12/2003  Anderberg
(Continued)

FOREIGN PATENT DOCUMENTS

CN    2286137       7/1998
CN    202202251 U   4/2012
JP    S63125706 A   5/1988

*Primary Examiner* — Raymond W Addie
(74) *Attorney, Agent, or Firm* — Noréns Patentbyrå AB

(57) ABSTRACT

Passenger bridge (100), comprising
a proximal end (110), comprising a passenger passage opening (111);
a distal end (120), comprising a bridge head (121);
at least one first bridge segments (130), a proximal one (131) of which comprises, at the said proximal end (110), said passenger passage opening (111);
at least one second segments (140), a distal one (142) of which comprises, at said distal end (120), the bridge head (121);
a first support structure (150), arranged to support said first (130) and second (140) bridge segments so that at least one of said first segments (130) and at least one of said second segments (140) can be individually tilted;
whereby the said first (130) and second (140) bridge segments together form a connected passage way for passengers between the proximal (110) and distal (120) ends, allowing the bridge head (121) to move vertically in relation the proximal end (110) by said bridge segments (130,140) tilting;
characterised in that the length of the distal second bridge segment (142) can be telescopably adjusted, thereby moving the bridge head (121) horizontally in relation to the proximal end (110), and in that the passenger bridge (100) further comprises a second support structure (Continued)

(160), supporting the distal end (120) and being individually horizontally movable in relation to the first support structure (150).

15 Claims, 9 Drawing Sheets

(51) Int. Cl.
*B63B 27/14* (2006.01)
*B64F 1/305* (2006.01)
(58) Field of Classification Search
USPC .................................. 14/71.5, 72.5; 114/362
See application file for complete search history.

(56) References Cited

U.S. PATENT DOCUMENTS

| | | |
|---|---|---|
| 8,484,786 B2 | 7/2013 | Anderberg |
| 8,505,140 B2 | 8/2013 | Anderberg |
| 9,238,512 B1 * | 1/2016 | Keith ..................... B64F 1/315 |
| 2016/0083114 A1 | 3/2016 | Kim et al. |

* cited by examiner

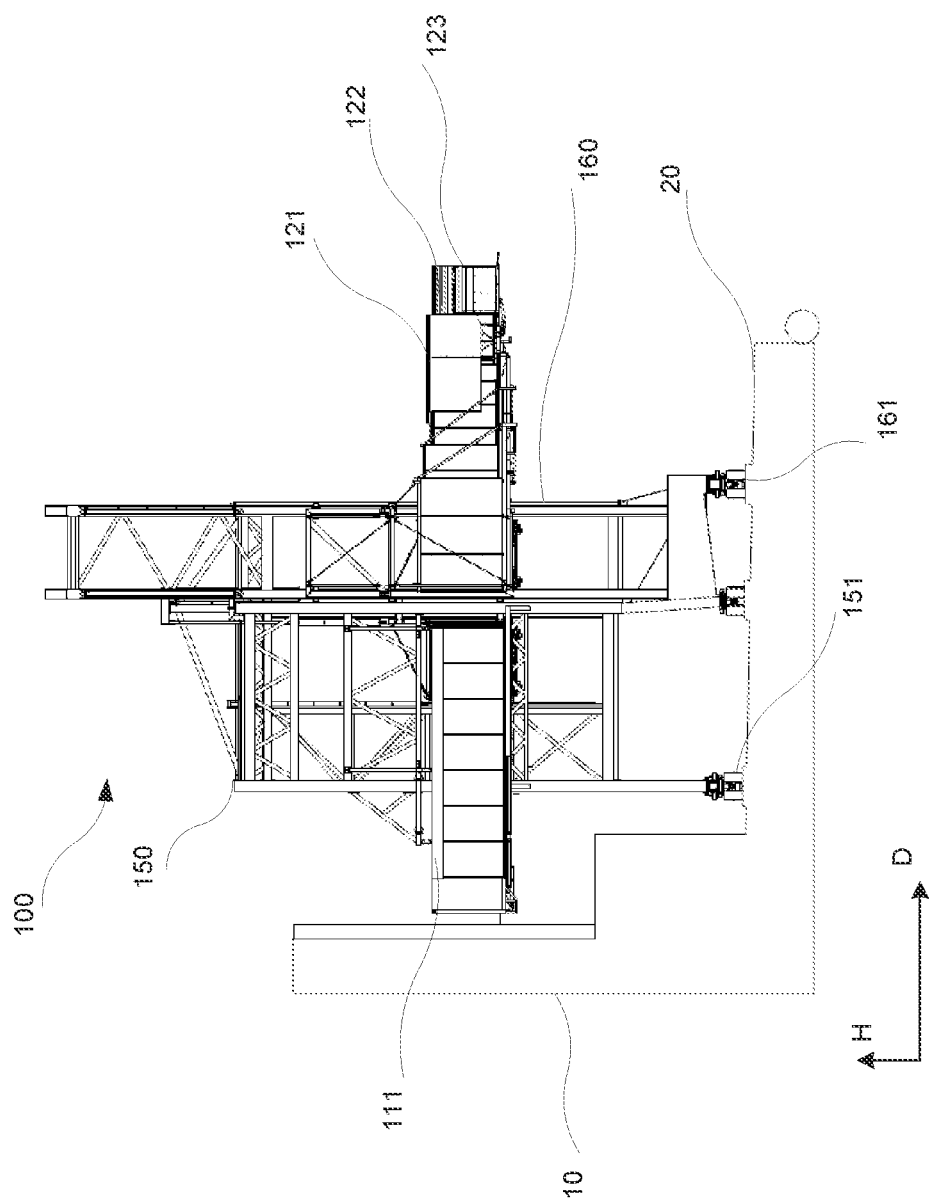

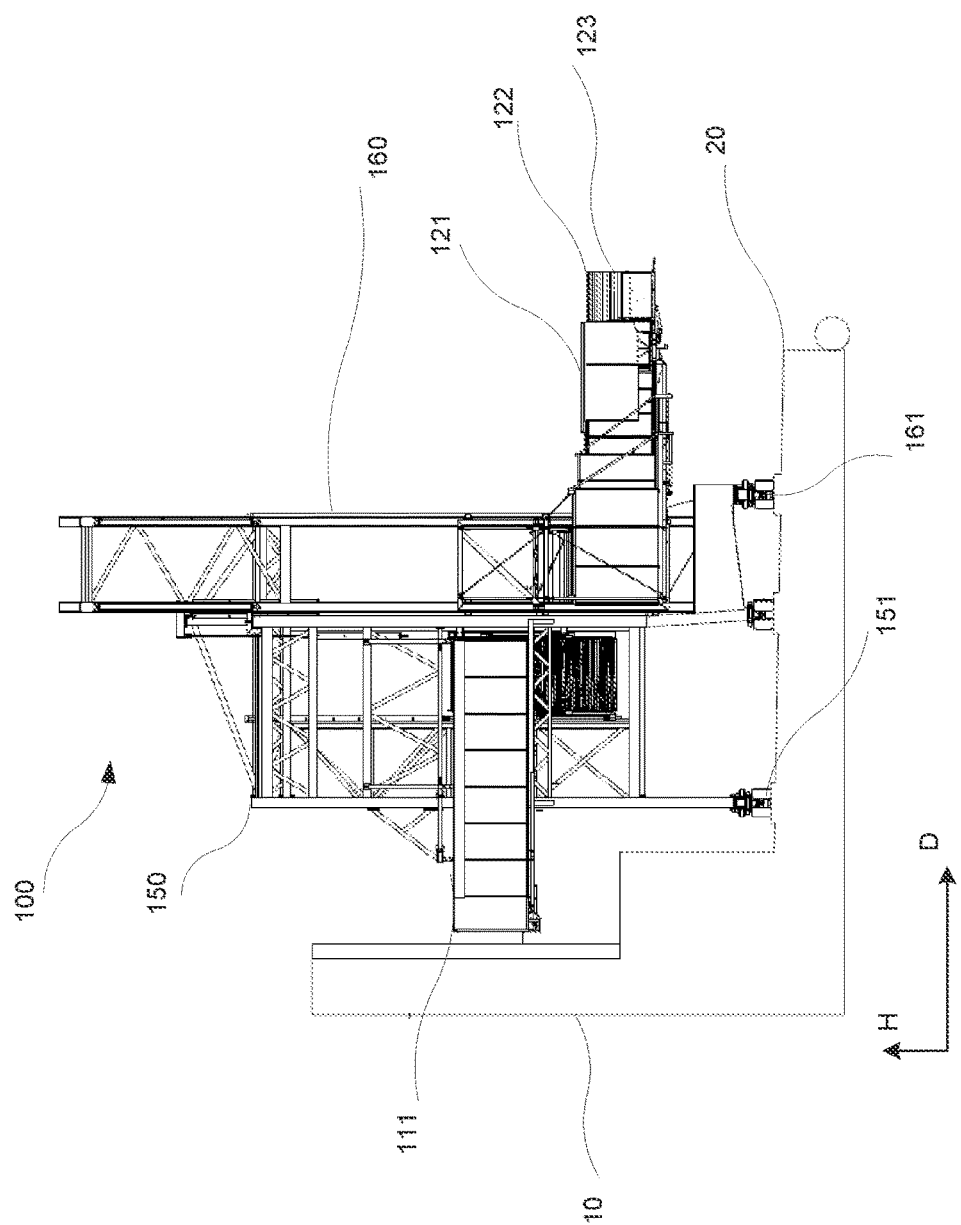

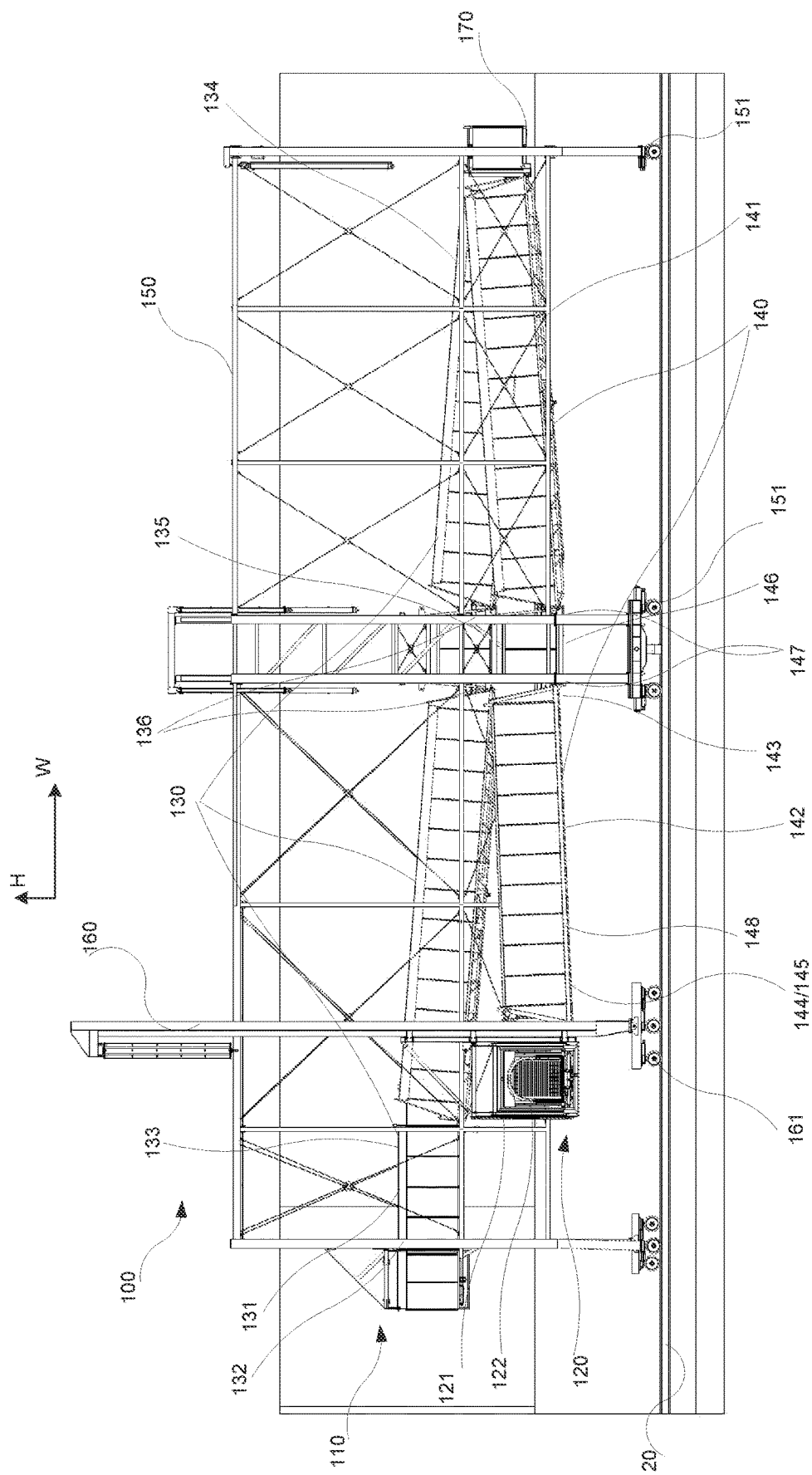

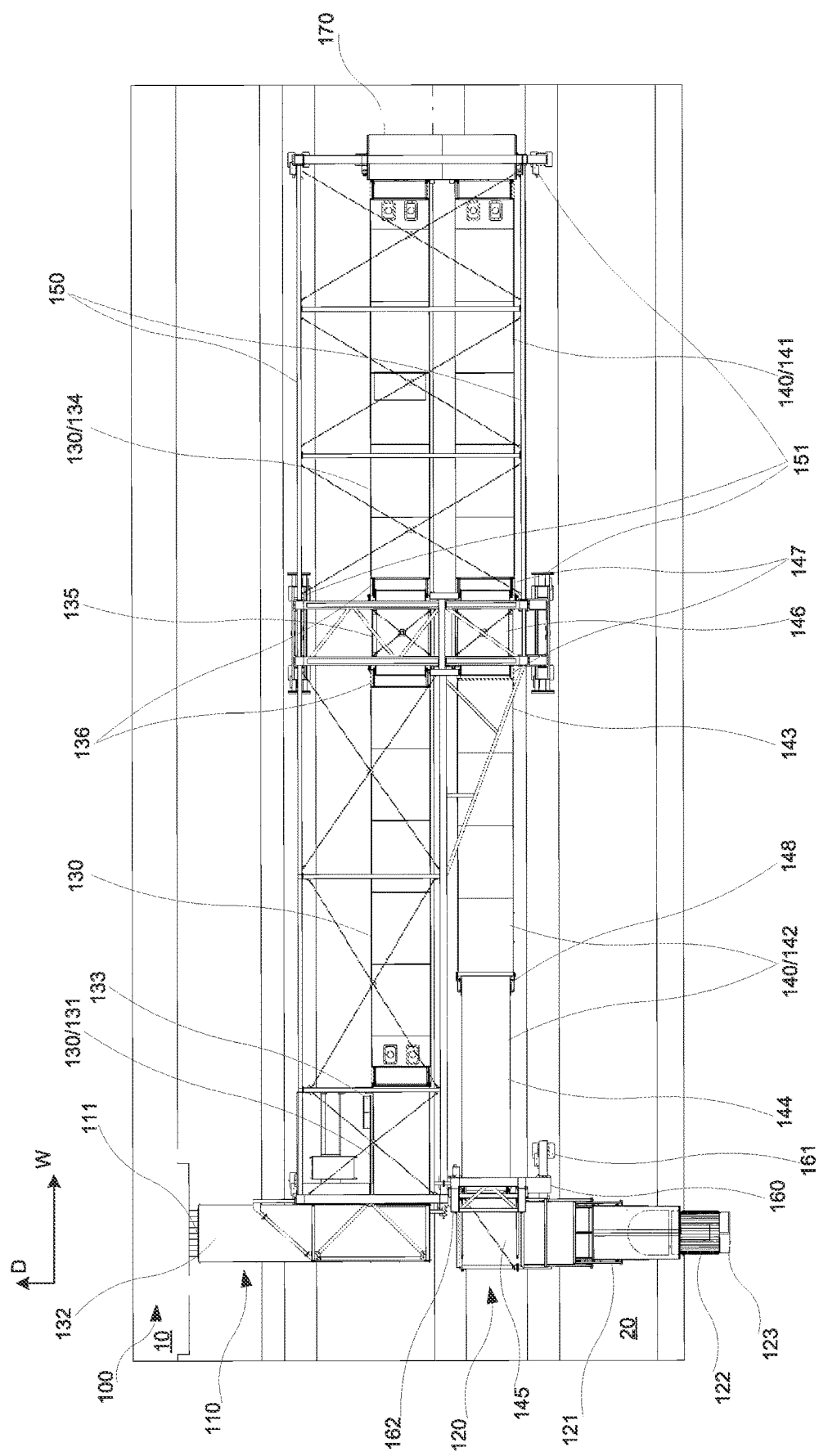

PASSENGER BRIDGE

The present invention relates to a passenger bridge, for allowing passengers passage to or from an opening in a ship, an airplane or similar.

Such passenger bridges are well-known as such, and are disclosed for instance in U.S. Pat. Nos. 8,484,786 B and 8,505,140 B.

In general, such passenger bridges are large and heavy structures, that have to not only operate reliably and for prolonged periods of time in outdoors environments with harsh weather conditions, but also to operate under rigorous safety regulations to provide full safety for passengers using the passenger bridges, even during emergency evacuations and the like. Therefore, such passenger bridges are built to be very sturdy.

At the same time, such bridges must be associated with certain flexibility, in order to be able to reach doors of various vessels. In particular, it is desired for a passenger bridge to be able to reach a door in a ship or similar across a relatively wide stretch of quay, since a ship may moor at different locations in relation to a passenger bridge, which is normally fixedly arranged at one end in relation to a passenger building or the like.

To achieve these objects, the above referenced passenger bridges, for instance, each comprises an outer, strong frame, supporting the whole bridge construction. Then, a bridge head of the bridge is allowed to move, within the frame, in a height direction in relation to the ground, while the whole frame is allowed to move on the ground in a horizontal direction.

There is, however, a general need for a passenger bridge providing even more bridge head positioning flexibility, being able to cater for a more diverse spectrum of vessel types without having to use different passenger bridges for different types of vessels to connect to.

The present invention solves the above described problems.

Hence, the invention relates to a passenger bridge, comprising a proximal end, comprising a passenger passage opening; a distal end, comprising a bridge head; at least one first bridge segments, a proximal one of which comprises, at the said proximal end, said passenger passage opening; at least one second segments, a distal one of which comprises, at said distal end, the bridge head; a first support structure, arranged to support said first and second bridge segments so that at least one of said first segments and at least one of said second segments can be individually tilted; whereby the said first and second bridge segments together form a connected passage way for passengers between the proximal and distal ends, allowing the bridge head to move vertically in relation the proximal end by said bridge segments tilting; characterised in that the length of the distal second bridge segment can be telescopably adjusted, thereby moving the bridge head horizontally in relation to the proximal end, and in that the passenger bridge further comprises a second support structure, supporting the distal end and being individually horizontally movable in relation to the first support structure.

In the following, the invention will be described in detail, with reference to exemplifying embodiments of the invention and to the enclosed drawings, wherein:

FIG. 2a is a first side view of the passenger bridge illustrated in FIG. 1, seen along a width direction and with the bridge head in the first position;

FIG. 2c is a third side view of the passenger bridge illustrated in FIG. 1, seen along a width direction and with the bridge head in a lower position;

FIG. 3c is a sixth side view of the said passenger bridge, seen along a depth direction and with the bridge head in a lower retracted position;

FIG. 4 is a top view of the said passenger bridge, with the bridge head in an extended direction.

The Figures share the same reference numerals for the same parts.

Figure 1:
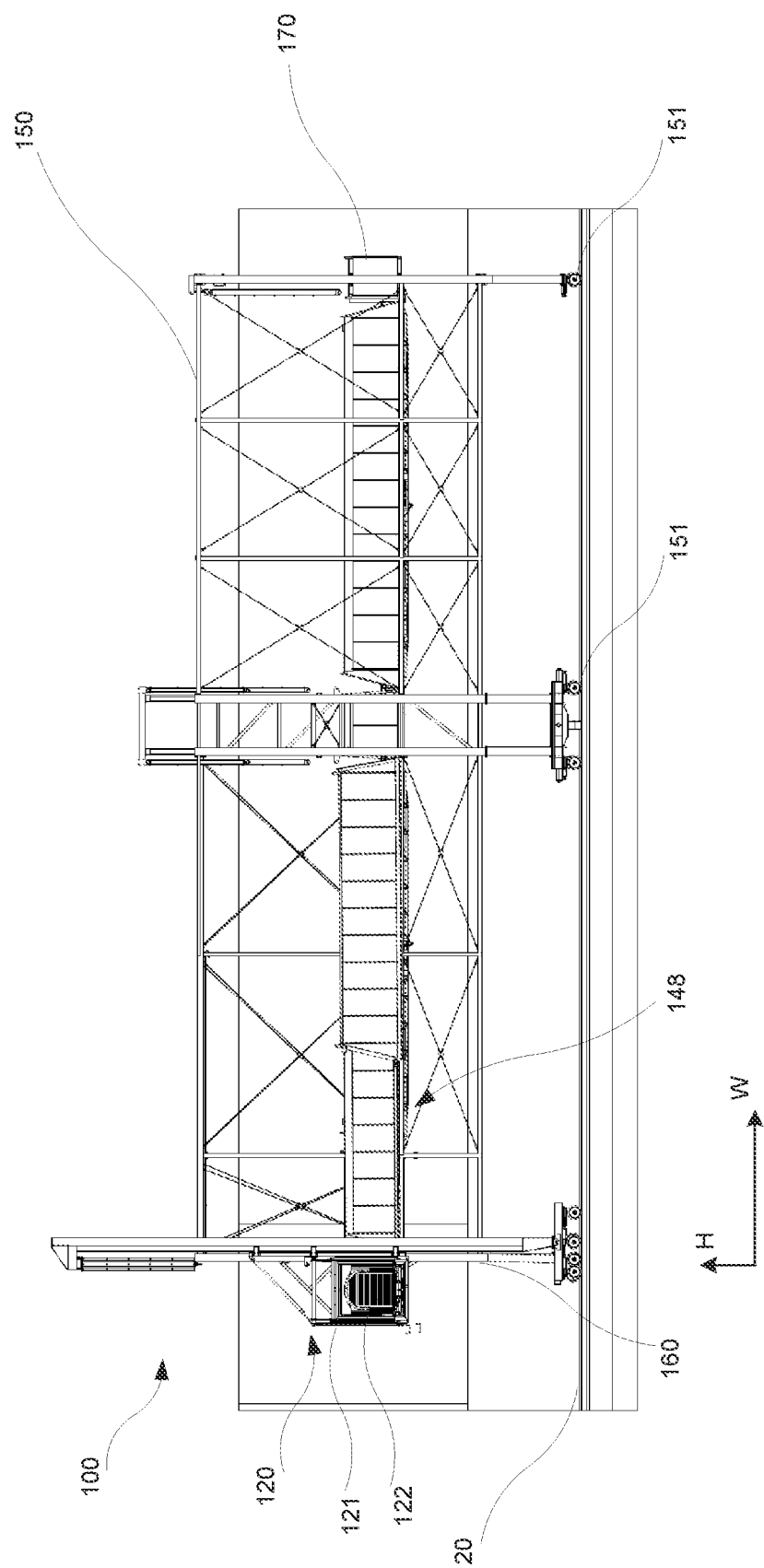
FIG. 1 is a side view of a passenger bridge according to the present invention, with a bridge head in a first position.

Hence, in the Figures a passenger bridge 100 according to the present invention is illustrated. The passenger bridge 100, which may be a passenger bridge 100 for allowing walking passengers to embark or disembark a passenger ship (not shown in the Figures), an airplane or similar, comprises a proximal end 110, in turn comprising a passenger passage opening 111. The passenger passage opening 111 may be arranged to be connected to, or in fact be connected to, a corresponding door or opening in a passenger building 10, such as a ticket and waiting hall, or an airport gate building. Hence, passengers will be able to walk from the passenger building 10, via the passenger bridge 100, to and from a passenger ship, an airplane or similar. In the following, only the example of a passenger ship will be described, but it is realized that the corresponding description is valid in relation to an airplane and so forth. In case of airport use, the passenger bridge 100 is supported on the airport ground tarmac instead of a quay 20.

The passenger bridge 100 may be arranged for use on a quay 20, on which quay 20 the passenger building 10 may also be arranged. The quay 20, and also the passenger bridge 100 itself, is associated with a width direction W, a perpendicular depth direction D and a perpendicular height direction H. Passengers generally embark and disembark the passenger ship in the depth direction D.

Furthermore, the passenger bridge 100 comprises a distal end 120, in turn comprising a bridge head 121. Bridge heads are well-known as such, and typically comprise a means for the passengers to move to and from the ship 10 (see below), and may also comprise equipment arranged to be connected to the ship, such as electrical connections and similar.

According to the invention, the passenger bridge 100 further comprises at least one first bridge segment 130. In the exemplifying passenger bridge 100 illustrated in the Figures, there are three first bridge segments 130. The first bridge segments 130 are preferably connected one to the next so as to form a connected corridor or tunnel for walking passengers, such as in the way illustrated in the Figures. A proximal one 131 of said first bridge segments 140 comprises, at the said proximal end 110 of the passenger bridge 100, said passenger passage opening 111.

In a corresponding manner, the passenger bridge 100 also comprises at least one second segment 140. In the exemplifying passenger bridge 100, there are two second bridge segments 140. As is the case for the first bridge segments 130, the second bridge segments 140 are preferably connected one to the next so as to form a connected corridor for walking passengers, an example of which is illustrated in the Figures. A distal one 142 of said second bridge segments 140 comprises, at the said distal end 120 of the passenger bridge 100, the said bridge head 121.

As is illustrated in the Figures, the passenger bridge 100 may advantageously comprise at least two first bridge segments 130 and at least two second bridge segments 140.

Moreover, the passenger bridge 100 comprises a first support structure 150, arranged to support both said first 130 and second 140 bridge segments so that at least one, preferably at least two, such as all but possibly one, of said first segments 130 and at least one, preferably at least two, preferably all, of said second segments 140 can be individually tilted. The "tilting" of the first 130 and second 140 segments described herein is performed in a vertical plane, about a horizontal axis, such as about an axis parallel to the width W or, preferably, the depth D direction. Raising and lowering of such segments 130, 140 also takes place in the same respective vertical plane.

In the passenger bridge 100 according to the present invention, the said first 130 and second 140 bridge segments together form a connected passage way for said walking passengers between the proximal 110 and distal 120 ends, allowing the said bridge head 121 to move vertically, the height direction H, in relation the proximal end 110 (and hence the passenger building 10) by said tilting of the bridge segments 130, 140, and possibly also by raising and lowering as described below.

According to the invention, the length of the distal second bridge segment 142, as measured along a main longitudinal passenger walking direction of said bridge segment 142, can be telescopably adjusted, such as using a telescoping arrangement 148 through which the passengers can walk, thereby as a result of said telescoping action moving the bridge head 121 horizontally in relation to the proximal end 110, while maintaining a continuous walking path for passengers through the said distal segment 142. For instance, a proximal part 143 of the distal segment 142 may be horizontally fixed to a neighbouring second segment to which it is connected, while a distal part 144 of the distal segment 142 may be movable in relation to the proximal part 143 via said telescoping arrangement 148, while the distal part 144 is connected to, and may support, the bridge head 121, thereby also moving the bridge head 121 horizontally in relation to the proximal end 110.

Further according to the invention, the passenger bridge 100 comprises a second support structure 160, supporting the distal end 120 and being individually horizontally, such as along the width direction W, movable in relation to the first support structure 150.

The second support structure 160 may support the distal part 144 of the distal second segment 142, but may furthermore not support the proximal part 143 of the distal second segment 142. Instead, the proximal part 143 may be supported by the neighbouring second segment 140 and/or by the first support structure 150. Hence, the second support structure 160 may move horizontally with the telescoping action of the bridge head 121, while the first support structure 150 be stationary.

With such a passenger bridge 100, it is possible to achieve very good range both in the height direction H and in the width direction W, in relation to a passenger ship mooring at the quay 20. In particular, the second support structure 160, which is individually movable in relation to the first support structure 150, provides sufficient stability even for very large passenger bridges 100 and even for very large reach variability. This will be exemplified in the following.

In some embodiments, the second support structure 160 comprises a set of wheels 161 for allowing the second support structure 160 to move independently horizontally along the ground. That the second support structure 160 is arranged to move "independently" horizontally is intended to mean that its horizontal movement, by the wheels 161 rolling on the ground, is independent in relation to the first support structure 150 within a certain horizontal movement interval, which may be at least 5 meters, preferably at least 10 meters, and possibly not more than 30 meters.

At any extent, both the first 150 and second 160 support structures may be arranged to support the respective segments and the bridge head 121 on the ground.

Furthermore, the first support structure 150 may also be arranged with wheels 151 allowing it to move horizontally on the ground. Such wheels 151 may allow the first support structure 150 to move in relation to the passenger building 10, such as during installation of the passenger bridge 100 at a particular passenger building 10. The wheels 151 of the first support structure 150 may support most, substantially the whole, or the whole, weight of the passenger bridge 100, in which case the movement of the wheels 151 implies movement of the whole passenger bridge 100. However, the independency of motion between the first 150 and second 160 support structures implies that the wheels 151 of the first support structure 150 may move horizontally without the second support structure 160 necessarily moving, at least along said horizontal freedom of motion interval.

As is illustrated in the Figures, the at least one first segments 130 run along a first horizontal direction, while the at least one second segments 140 run along a second, opposite horizontal direction, adjacent to the at least one first segments 130. Thus, at least one, preferably all, of the first segments 130, are arranged to run in parallel to at least one, preferably all, of the second segments 140, along said horizontal direction, which may be the width direction W. As above, the direction of each segment along which it "runs" refers to a main walking direction of passengers traversing the segment in question. It is realized that, as each segment may be tilted as described herein, such a horizontal direction may in fact be a non-horizontal direction but a direction having a horizontal component, or be a horizontal direction of a ground projection of the segment in question. It is this horizontal direction to which the said parallel arrangement refers.

Furthermore, the passenger bridge 100 may comprise a horizontal platform 170 connecting, for the purpose of allowing walking passengers to pass, a distal one 134 of said at least one first bridge segments 130 to a proximal one 141 of said at least one second bridge segments 140, allowing passengers to pass from the connected tunnel formed by the interconnected first segments 130 to the connected tunnel formed by the interconnected second segments 140. Alternatively, the passenger bridge 100 may comprise three or more sets of such interconnected segments (not shown in the Figures). In this case, such sets of segments may run in alternating opposite and parallel horizontal directions, allowing even further bridge head 121 positioning freedom in relation to a passenger ship. Then, the horizontal platform 170 may be arranged to connect the distal segment 134 in question to a proximal one of a set of at least one third bridge segments (not shown in the Figures) that may be arranged between said at least one first segments 130 and said at least one second segments 140, forming said connected passage way. In this case, there may also be more than one such horizontal platforms, such as one between each such connected set of segments.

The horizontal platform 170 may be arranged to be raised and lowered in said first support structure 150, either as a result of the horizontal platform 170 being passively supported by the respective connected segments 134, 141 and possibly also, by sliding arrangement, the first support structure 150, or via active control using a control unit of the below described type.

It is realized that the segments 134, 141 may be connected in other ways than the horizontal platform 170 illustrated in the Figures, such as via a direct connection door between the segments 134, 141 in question. This also applies to the case in which there are more than two sets of segments 130, 140.

As illustrated in the Figures, the passenger passage opening 111, or more precisely the main direction of motion of passengers moving through the passenger passage opening 111 to and from the passenger bridge 100, is arranged substantially perpendicularly to the said proximal one 131 of said at least one first segments 130, or more precisely to a horizontal component or ground projection of a main longitudinal direction of the said proximal segment 131. Hence, the proximal segment 131 may comprise the passenger passage opening 111 as a sideways oriented opening near its proximal end 132. The passenger passage opening 111 may be arranged directed in the depth direction D.

Furthermore, the bridge head 120, or more precisely a main embarking/disembarking direction of walking passengers through the bridge head 120 to and from a passenger ship, may be arranged substantially perpendicularly to the said distal one 142 of said at least one second segments 140, or more precisely to a horizontal component or ground projection of a main longitudinal direction of the said distal segment 142. The said embarking/disembarking direction may be arranged in parallel, or substantially in parallel, to the said passenger passage opening 111 direction, and in particular arranged to be parallel to the depth direction D.

In the above described case with connected sets of segments 130, 140, and where at least the second support structure 160 is supported on wheels, the first 150 and second 160 support structures may advantageously engage each other in a horizontally slidable manner. This may imply that the second support structure 160 is horizontally slidable in relation to the first support structure 150, which in turn may be stationary once installed at the correct position in relation to the passenger building 10. The slidable engagement may comprise metal guides arranged to guide the wheels 161 of the second support structure 160 or any other part of the second support structure 160 arranged near a bottom (in the height direction H) of the second support structure 160. Furthermore, the slidable engagement may also comprise guides acting on an upper (in the height direction) part of the second support structure, such as in combination with guides acting on the said lower part forming a lower engagement point. The upper engagement point is preferably arranged, in the height direction H, at least as high as the bridge head 121. This provides a very robust construction, in particular in case the bridge head 121 is telescopable and/or extends in the depth direction D externally to the second support structure 160.

Namely, as is illustrated in the Figures, the bridge head 121 may be arranged at least to a part, such as at least to 50%, externally to the second support structure 160 in the horizontal plane. In particular, the bridge head 121 may protrude externally to a ground projection of the second support structure 160, in the depth direction D away from the proximal end 110 and towards a passenger ship to which the passenger bridge 100 is, or is to be, connected. The depth direction D protrusion may, in this case, be at least 50% of the total depth direction D length of the bridge head 121. Preferably, the bridge head 121 may extend at least 4, preferably at least 8, meters out from said second support structure, including said cabin 122.

In particular, the bridge head 121 may be arranged to be telescopably lengthened and shortened, in the horizontal plane, along its longitudinal direction. This telescopable lengthening and shortening is preferably in the same direction, such as the depth direction D, as the said external protrusion direction. More particularly, the said at least 50% external protrusion of the bridge head 121 in relation to the second support structure 160 may be in a fully telescopably lengthened state of the bridge head 121.

In some embodiments, the bridge head 121 comprises a cabin 122 for embarking and disembarking passengers to and from the passenger ship, and which cabin 122 may be conventional as such. The cabin 122 can be turned in the horizontal plane in relation to a vertical axis running through the bridge head 121, yielding further mooring and passenger bridge 100 positioning flexibility. The cabin 122 in turn comprises a cabin door 123, through which passengers can move and thereby to embark/disembark. Preferably, the cabin 122 further comprises a gangway arranged to engage with the door of a passenger ship in a depth direction D slidable engagement. It is preferred that the passenger bridge 100 as a whole, and in particular the bridge head 121 and the cabin 122, is not arranged to actively adjust the depth direction D position of the cabin or a gangway in relation to the short-term movements of a moored passenger ship due to water movements. The passenger bridge 100 structure described herein will provide adequate performance in the less complicated (and therefore desired) case with a passive, slidable engagement between a gangway and a passenger ship door.

Regarding the said sets of first 130 and second 140 bridge segments, and possibly also for any additional third, fourth, and so on, sets of segments (as discussed above), for each such bridge segment within such a set 130, 140 the segments in question may be connected one to the other via a respective horizontal platform 135 (first set 130), 146 (second set 140). Each such horizontal platform 135, 146 may then be arranged to be raised and lowered in relation to the first support structure 150, possibly by passively following the height direction H movements of the connected bridge segments in question, such as via a suitable link arm system connected to the respective segments in turn being connected by the horizontal platform in question, or via active pivot angle control in relation to the connected bridge segments in question. Namely, each respective bridge segment in said set 130, 140 in question may be pivotally connected to each respective horizontal platform 135, 146, which pivotal connection may then be arranged so that each horizontal platform 135, 146 is maintained horizontal while the respective connected bridge segment is lowered, raised and tilted, as the case may be. In case the control is active, it may be performed based upon a sensed tilting angle of the horizontal platform 135, 146 in question, which may be used in a feedback control loop with the aim of maintaining a horizontal orientation of the platform 135, 146 in question.

Figure 2B:
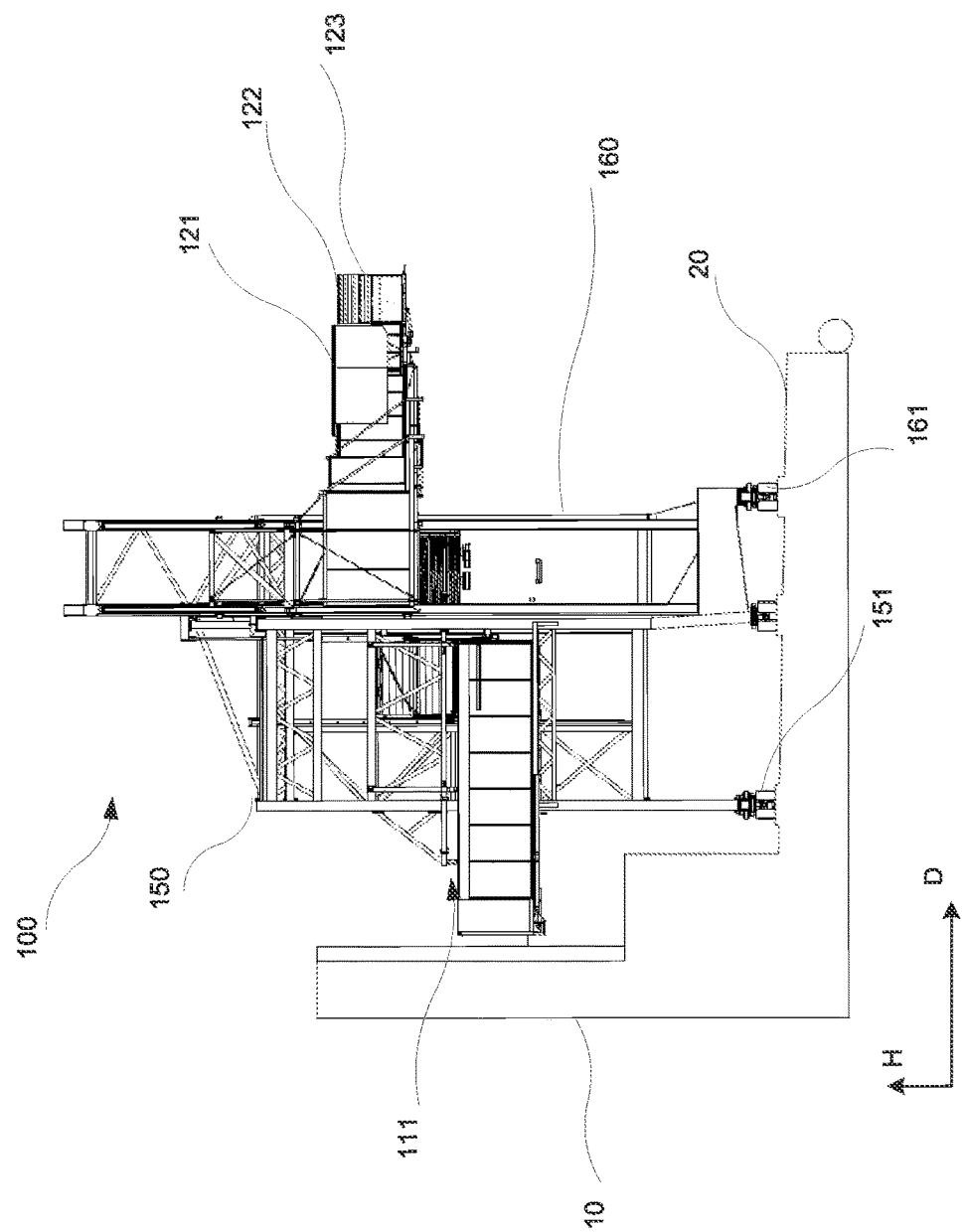
FIG. 2b is a second side view of the passenger bridge illustrated in FIG. 1, seen along a width direction and with the bridge head in an upper position.

As is illustrated in the Figures, the bridge head 121 may preferably be arranged to be vertically (in the height direction H) adjusted, by tilting the first 130 and/or second 140 segments, which tilting may be independent between differing such segments. The bridge head 121 may hence be vertically adjusted between a highest position (illustrated in FIG. 2b) and 2a lowest position (illustrated in FIG. 2c). The lowest and highest positions for the bridge head 121 may be arranged in relation to the passenger passage opening 111 of the above mentioned proximal end 110 of the passenger bridge 100 so that the said passenger passage opening 111 is vertically (height direction H) arranged between the said highest and said lowest position for the bridge head 121. The passenger passage opening 111 is then arranged at a suitable height H for connecting to a passenger building opening.

In particular, the cabin door 123 may be adjustable this way to a lowest position, in which the cabin door 123 is arranged at a lower height H than the passenger passage opening 111, and to a highest position, in which the cabin door 123 is arranged at a higher height H than the passenger passage opening 111. Due to the possibility of tilting the segments 130, 140, the bridge head 121 may be movable across a continuous height direction H interval between said highest and said lowest position.

In particular, in some embodiments, at least one, preferably all but the proximal one 131, of said first segments 130 and at least one, preferably all, of said second segments 140 may be individually tilted, and/or individually raised and lowered, in the first support structure 150.

That a segment is "individually" tilted, raised or lowered means that it can be tilted, raised or lowered, respectively, without imparting any tilt, raising or lowering to any other segments, apart from the necessary movements of neighbouring segments resulting from the movement of one or both ends of the segment in question which is tilted, raised or lowered. Hence, apart from the fact that the segments are connected so as to provide a connected walking tunnel for passengers, every segment may be individually controllable in terms of tilting, lower and raising. While imparting such tilting, raising and/or lowering, each segment is preferably individually supported by the first support structure 150, via a suitable vertically (in the height direction H) controlled and slidable supporting engagement between the segment in question and the first support structure 150.

In a preferred embodiment, the proximal first segment 131 is horizontally arranged.

Figure 3A:
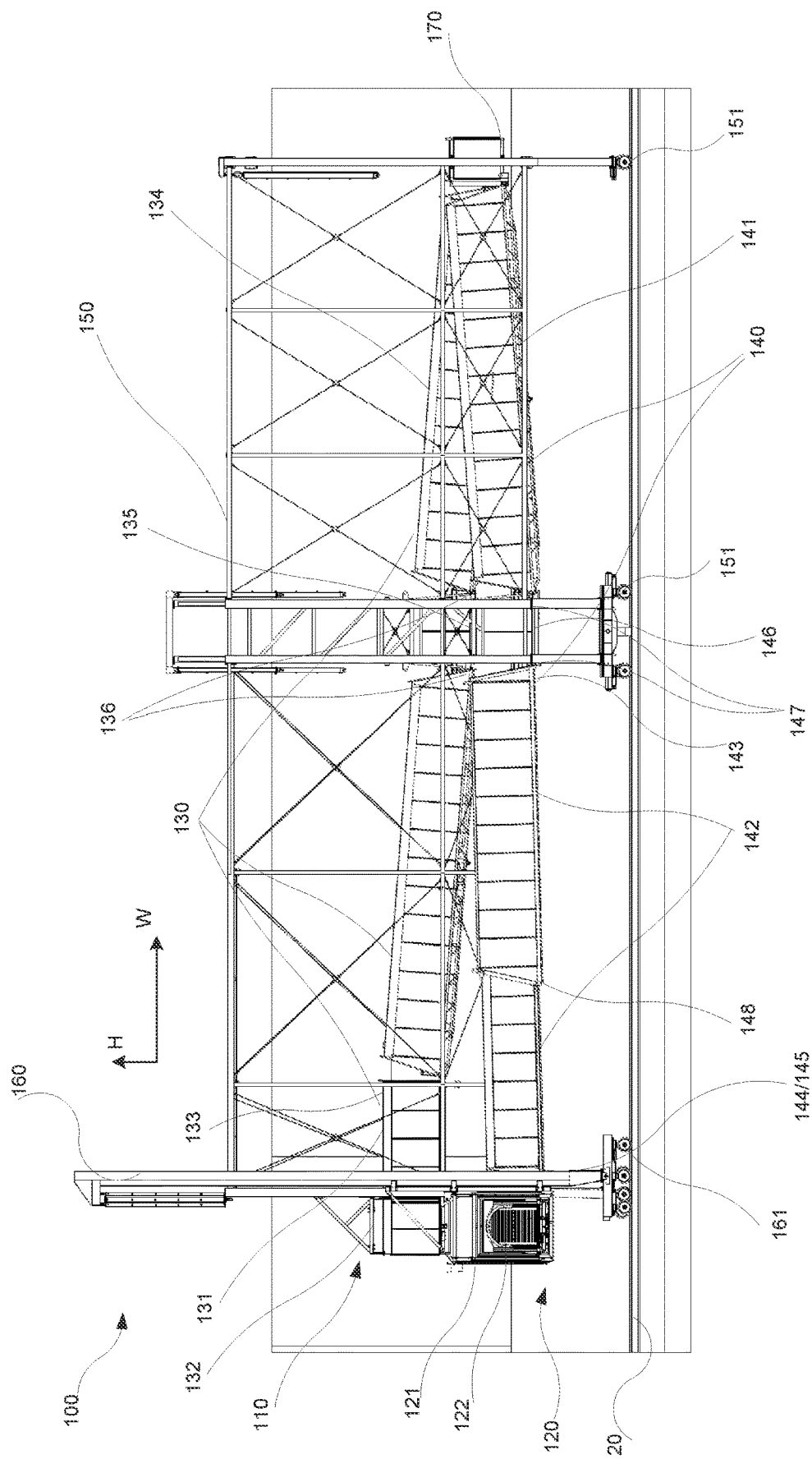
FIG. 3a is a fourth side view of the said passenger bridge, seen along a depth direction and with the bridge head in a lower extended position.
Figure 3B:
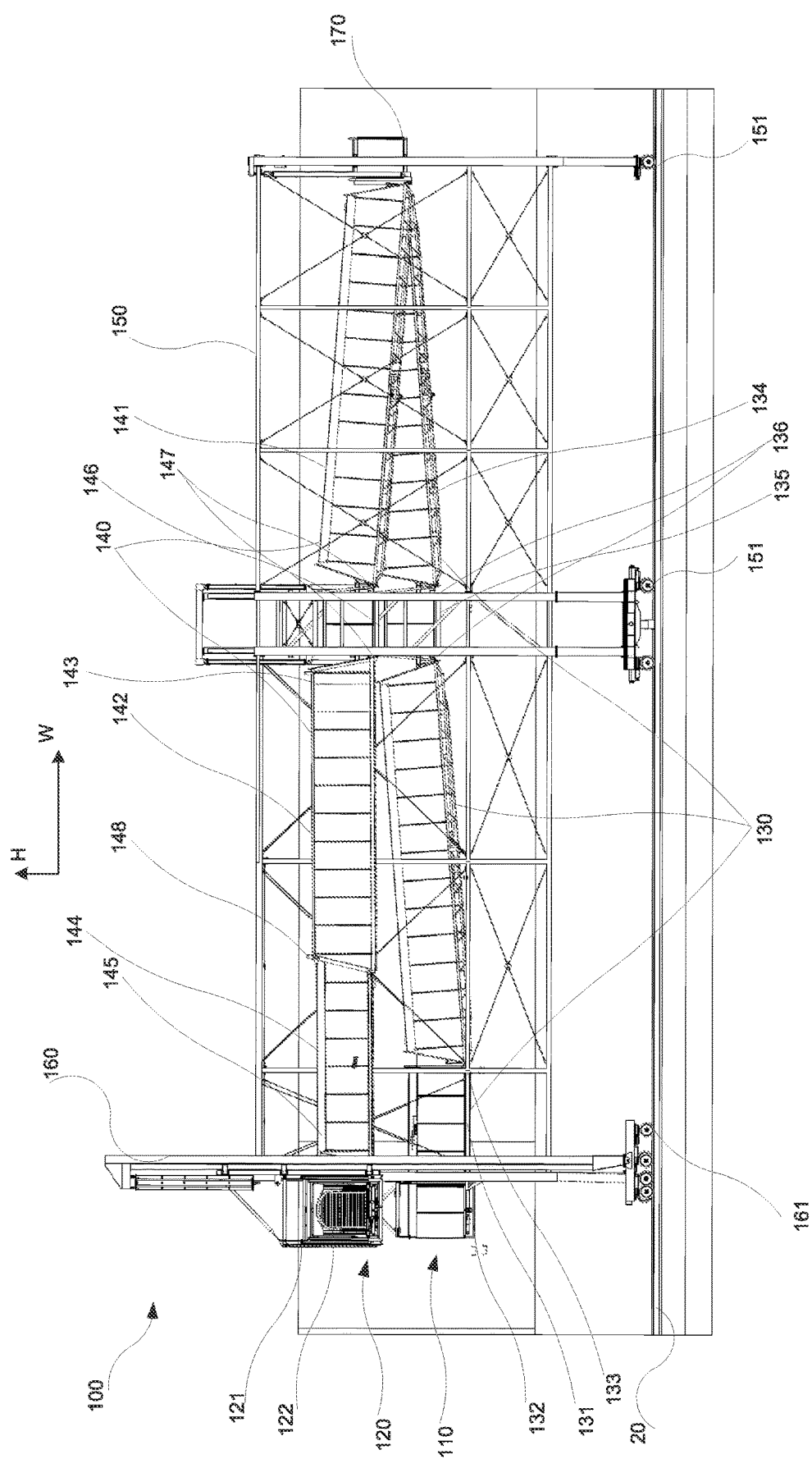
FIG. 3b is a fifth side view of the said passenger bridge, seen along a depth direction and with the bridge head in an upper extended position.
Figure 3D:
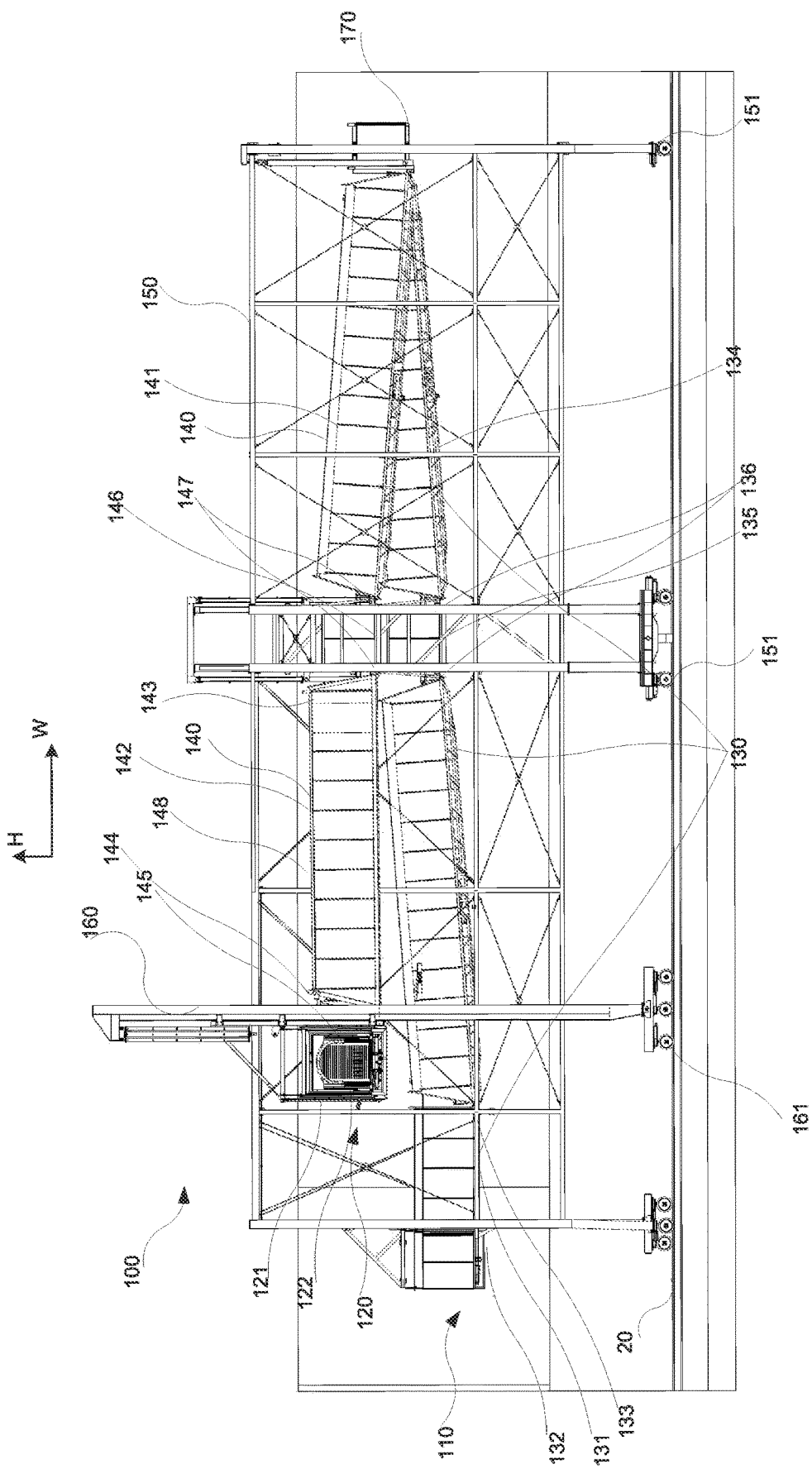
FIG. 3d is a seventh side view of the said passenger bridge, seen along a depth direction and with the bridge head in an upper retracted position.

Moreover, the bridge head 121 may advantageously be horizontally adjustable, such as in the width direction W, between a first, extended, extreme position (shown in FIGS. 3a and 3b) and a second, retracted, extreme position (shown in FIGS. 3c and 3d), using said telescopable arrangement of the distal second bridge segment 142. Advantageously, such horizontal adjustment can be made horizontally, and preferably continuously, at least between width direction W position of a proximal end 132 and a width direction W position of a distal end 133 of the said proximal first segment 131. In particular, the first and second horizontal extreme positions of the bridge head 121 may be arranged so that the cabin door 123 moves between the said proximal 132 and distal 133 ends of the proximal segment 131 in the width direction W.

Each of the above described controls of the tilt and height direction H position of individual segments 130, 140; the tilt of horizontal platforms 135, 146, 170; the telescoping action of the distal segment 142; and the telescoping action of the bridge head 121 may independently be imparted in each case by a central control unit (now shown in the Figures). Such control is preferably performed using electric motors or, more preferably, hydraulic control using a centrally located hydraulic pressure device and a hydraulic pipe work arranged to transfer the hydraulic force from the centrally located hydraulic pressure device to each local control action point. The control may be based upon measured positions and tilts, provided by locally arranged measurement devices arranged to provide measurement information to the control using. The control unit may also comprise a computer device arranged to perform an automatic, feedback loop based control, and possibly also a supervision function that may also be based upon received measurement data of the said type.

In general, the width direction W slidable engagement between the first 150 and second 160 support structures, in combination with the width direction W telescopability of the distal segment 142; the height direction H adjustability of the first 130 and second 140 sets of segments; and the depth direction D telescopability of the bridge head 121, provides a very wide reach in all directions W, H, D, while still achieving a very robust and sturdy construction for use for prolonged time periods under very harsh environmental conditions.

In particular, the slidabale engagement between the first 150 and second 160 support structures involves no or only minimal play in the depth direction D, and in particular comprises means for preventing the second support structure 160 to pivot, about an axis parallel to the width direction W, in relation to the first support structure 150, and in particular to prevent the bridge head 121 to "fall out" towards the passenger ship in the depth direction D. Such means may, for instance, be said upper slidable engagement point.

The said proximal first segment 131 may be non-tiltable, non-raisable and non-lowerable, as is best illustrated in FIGS. 3a-3d.

Both the first 150 and second 160 support structures may be designed as a respective steel framework, and in particular the first support structure 150 may generally comprise a respective support corridor for each of said sets 130, 140 of segments, along which support corridor the respective segments 130; 140 are arranged to run and be supported in a way permitting them to be individually tilted, raised and lowered as described above.

The longitudinal length of each tiltable segment may be at least 10 meter, and at the most 25 meters.

Above, preferred embodiments have been described. However, it is apparent to the skilled person that many modifications can be made to the disclosed embodiments without departing from the basic idea of the invention.

For instance, as mentioned above more than two sets 130, 140 of segments can be used, in order to increase height direction H reach for the passenger bridge 100. In this case, the first support structure 150 may comprise one support corridor of the said type for each one of said sets of segments.

Furthermore, selectively activatable passenger shortcut openings may be arranged along the connected passenger tunnel formed by the segments 130, 140, such as between the proximal end 132 of the proximal first segment 131 and the distal end 145 of the distal second segment 142; or, in the case of more than two sets of segments 130, 140, between a proximal segment of such a set and a distal segment of a subsequent set, arranged to selectively shortcut a pair of such sets of segments.

The passenger bridge 100 may, of course, also comprise additional parts, in addition to those shown in the Figures, such as an additional bridge head arranged at the proximal second segment 141 and arranged for selective activation when width direction W reach is desired to be very wide.

Hence, the invention is not limited to the described embodiments, but can be varied within the scope of the enclosed claims.

The invention claimed is:

1. A passenger bridge (100), comprising:
a proximal end (110), comprising a passenger passage opening (111);
a distal end (120), comprising a bridge head (121);
at least one first bridge segments (130), a proximal one (131) of which comprises, at the said proximal end (110), said passenger passage opening (111);
at least one second segments (140), a distal one (142) of which comprises, at said distal end (120), the bridge head (121);
a first support structure (150), arranged to support said first (130) and second (140) bridge segments so that at least one of said first segments (130) and at least one of said second segments (140) can be individually tilted;
whereby the said first (130) and second (140) bridge segments together form a connected passage way for passengers between the proximal (110) and distal (120) ends, allowing the bridge head (121) to move vertically in relation the proximal end (110) by said bridge segments (130,140) tilting;
wherein the length of the distal second bridge segment (142) can be telescopably adjusted, thereby moving the bridge head (121) horizontally in relation to the proximal end (110),
wherein the passenger bridge (100) further comprises a second support structure (160), supporting the distal end (120) and being individually horizontally movable in relation to the first support structure (150), and
wherein second support structure (160) comprises a respective set of wheels (161) for allowing the respective support structure (160) to move independently and horizontally on the ground,
wherein the at least one first segments (130) run along a first horizontal direction, in that the at least one second segments (140) run along a second, opposite horizontal direction, adjacent to the at least one first segments (130), and in that a distal one (134) of said at least one first bridge segments (130) is connected to a proximal one (141) of said at least one second bridge segments (140), or alternatively to a proximal one of a set of at least one third bridge segment arranged between said at least one first segments (130) and said at least one second segments (140), forming said connected passage way, and in that the first (150) and second (160) support structures engage each other in a horizontally slidable manner.

2. The passenger bridge (100) according to claim 1, wherein the first support structure (150) also comprises a respective set of wheels (151,161) for allowing the respective support structure (150,160) to move independently and horizontally on the ground.

3. The passenger bridge (100) according to claim 1, wherein said connection forming said connected passage way, is achieved by a horizontal set platform (170) comprised in the passenger bridge (100).

4. The passenger bridge (100) according to claim 3, wherein the horizontal set platform (170) is arranged to be raised and lowered in said first support structure (150).

5. The passenger bridge (100) according to claim 1, wherein the passage opening (111) is arranged substantially perpendicularly to the said proximal one (131) of said at least one first segments (130).

6. The passenger bridge (100) according to claim 1, wherein the bridge head (121) is arranged substantially perpendicularly to the said distal one (142) of said at least one second segments (140).

7. The passenger bridge (100) according to claim 1, wherein the bridge head (121) comprises a cabin (122), which can be turned in the horizontal plane in relation to a vertical axis running through the bridge head (121).

8. The passenger bridge (100) according to claim 1, wherein at least one of said first bridge segments (130) is connected to another one of said first bridge segments (130) via a respective first horizontal segment platform (135), each such first horizontal segment platform (135) being raisable and lowerable in the first support structure (150), in that each respective first bridge segment (130) is pivotally connected to each respective first horizontal segment platform (135), the pivotal connection being arranged so that each first horizontal segment platform (135) is maintained horizontal while the respective first bridge segment (130) is lowered, raised and/or tilted.

9. The passenger bridge (100) according to claim 1, wherein at least one of said second bridge segments (140) is connected to another one of said second bridge segments (140) via a respective second horizontal segment platform (146), each such second horizontal segment platform (146) being raisable and lowerable in the second support structure (160), in that each respective second bridge segment (140) is pivotally connected to each respective second horizontal segment platform (146), the pivotal connection being arranged so that each first horizontal segment platform (146) is maintained horizontal while the respective first bridge segment (140) is lowered, raised and/or tilted.

10. The passenger bridge (100) according to claim 1, wherein the passenger bridge (100) comprises at least two first bridge segments (130) and at least two second bridge segments (140).

11. The passenger bridge (100) according to claim 1, wherein the bridge head (121) can be vertically adjusted, by tilting the first (130) and/or second (140) segments, between a highest and a lowest position, and in that the passenger passage opening (111) is vertically arranged between the highest and the lowest position.

12. The passenger bridge (100) according to claim 1, wherein at least one of said first segments (130) and at least one of said second segments (140) can be individually tilted, and/or individually raised and lowered, in the first support structure (150).

13. The passenger bridge (100) according to claim 1, wherein the proximal first segment (131) is horizontally arranged, the bridge head (121) can be horizontally adjusted between a first and a second extreme position, using said telescopable arrangement, and such horizontal adjustment can be made horizontally between a proximal (132) and a distal (133) end of the said proximal first segment (131).

14. The passenger bridge (100) according to claim 1, wherein the bridge head (121) is arranged at least to a part, such as at least to 50%, externally to the second support structure (160) in the horizontal plane.

15. The passenger Pas-bridge (100) according to claim 1, wherein the bridge head (121) is arranged to be telescopably lengthened and shortened, in the horizontal plane, along its longitudinal direction.

* * * * *